United States Patent
Lissotschenko et al.

(10) Patent No.: US 6,356,682 B1
(45) Date of Patent: Mar. 12, 2002

(54) DEVICE FOR MAKING GRID STRUCTURES IN OPTICAL FIBERS

(76) Inventors: Vitalij Lissotschenko, Tospelliweg 19, D-44149 Dortmund; Joachim Hentze, Haus Lohe 1, D-59457 Werl, both of (DE)

(*) Notice: Subject to any disclaimer, the term of this patent is extended or adjusted under 35 U.S.C. 154(b) by 0 days.

(21) Appl. No.: 09/403,195
(22) PCT Filed: Apr. 16, 1998
(86) PCT No.: PCT/EP98/02220
§ 371 Date: Jan. 18, 2000
§ 102(e) Date: Jan. 18, 2000
(87) PCT Pub. No.: WO98/47029
PCT Pub. Date: Oct. 22, 1998

(30) Foreign Application Priority Data

Apr. 16, 1997 (DE) .......................... 197 15 807

(51) Int. Cl.[7] .............. G02B 6/34; G02B 6/32
(52) U.S. Cl. ........................... 385/37; 359/710
(58) Field of Search ............... 385/37; 359/710

(56) References Cited

U.S. PATENT DOCUMENTS 4,405,207 A * 9/1983 Kay .................... 359/642
5,216,543 A * 6/1993 Calhoun ................ 359/619
5,367,588 A 11/1994 Hill et al. .................. 385/37
5,550,948 A 8/1996 Inniss et al. ............. 385/147

FOREIGN PATENT DOCUMENTS

EP 0 687 992 A 12/1995
GB 2 210 470 A 6/1989

OTHER PUBLICATIONS

Timp, et al.: "Using light as a lens for submicron, neutral–atom lithography" Physical Review Letters vol. 69, No. 11, Sep. 14, 1992, pp. 1636–1639.

* cited by examiner

Primary Examiner—John D. Lee
Assistant Examiner—Sarah U. Song
(74) Attorney, Agent, or Firm—Hoffman, Wasson & Gitler

(57) ABSTRACT

The present invention relates to a device for making grid structures in optical fibers. The device comprises a laser beam emitter directed toward the surface enveloping the optical fiber and beam converting elements, characterized by having at least one fan-shaped cylindrical lens. The optical fiber is placed in the beam's focal plane, and the beam converting elements are able to be displaced relative to the optical fiber.

8 Claims, 2 Drawing Sheets

DEVICE FOR MAKING GRID STRUCTURES IN OPTICAL FIBERS

Figure 1:
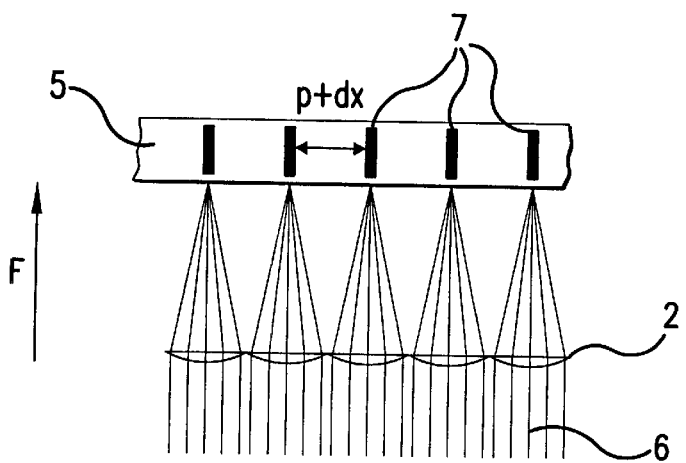
Figure 1:
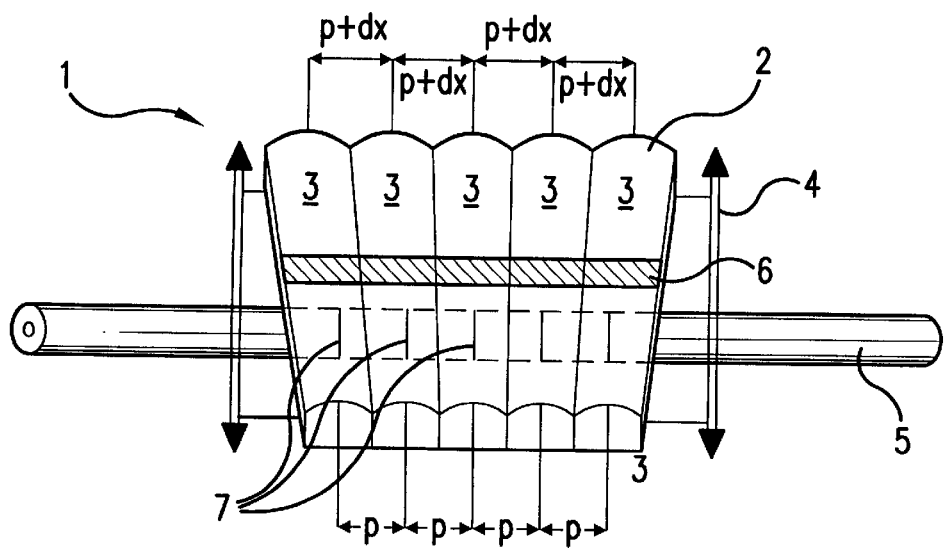
Figure 1:
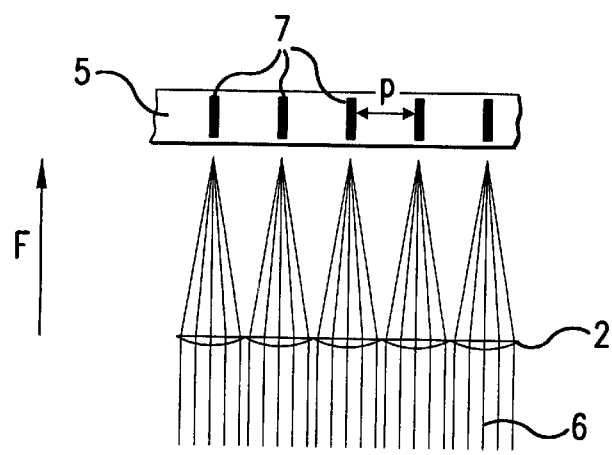

The invention relates to a device for making grid structures in optical fibers by local laser radiation, with a laser emitter installed on the surface enveloping the optical fiber, as well as beam converting facilities-inserted between the laser emitter and the optical fiber.

Optical gratings are made perpendicular to the laser's longitudinal direction in the material on the boundary layer between the optical fiber's core and cladding or on the cladding's exterior, in order to correct dispersion in the optical fibers and to compensate for a given amplitude-frequency curve associated with the light source being used. Here, the order of magnitude of the grating constants is either approximately $0.5\mu$ for a narrow-band amplification for carrying out wavelength division multiplexing, such as in erbium amplifiers, or in the order of magnitude of several hundred p to compensate for different amplitude-frequency characteristics of the emitter being used. Grids with different grating constants are sometimes combined with one another in optical filter structures for the above applications. The grids are usually equidistant, but non-equidistant grids are also used for special applications.

The grid structures are made by exposing the optical fiber to a linear laser beam of sufficient intensity, which penetrates the cladding from the outside. Energy absorption around the boundary causes a local structural change in the material, resulting in a permanent change in the index of refraction at these points. Such structures are generated at a distance corresponding to the desired grating constant to produce a diffraction grating.

It is decidedly time-consuming and consequently uneconomical to produce an entire grid structure by sequential exposure using a single focused laser beam. It is also possible for inaccuracies to occur from the frequent relative motions of the fiber and optical system to one another. Several well-known methods exist that produce the desired grid structure through simultaneous exposure of the fiber. One known option, for example, consists of drawing the master diffraction grating toward the light source. The intensity of the individual diffraction maxima are indeed relatively small in this case, and the total efficiency is relatively small, so that only maxima of low order can be utilized. Another known possibility provides for exposure through a slot mask. The disadvantages of this method are that the efficiency is very low, since most of the incident light is absorbed by the mask, and that the masks are difficult and expensive to manufacture. In addition, the width of the structures that can be produced is limited by the diffraction effects at the mask's apertures. Not least, this method is relatively inflexible, since the mask itself generally becomes largely unusable after the exposure process.

Proceeding from these difficulties, it is the basic objective of the invention to make available an exposure device for optical fibers that enables improved utilization of the light, i.e. has better efficiency, and is more flexible in its application than existing known systems.

To solve this problem, the invention proposes that the beam converting facilities should have at least one fan-shaped cylindrical lens array aligned perpendicular to the optical fiber, with the optical fiber being placed in the focusing plane, which can also be displaced relative to said optical fiber.

According to the invention, a cylindrical lens array is illuminated with a collimated, line-shaped laser beam longitudinal with respect to the fiber to be exposed, that illuminates the entire width of the array. The laser beam is focused into the fiber by each separate cylindrical lens, i.e. at the boundary between the core and the cladding, or within the cladding, so that the lumination needed for structural conversion exists at these points. The grating period results from the relative distance between the cylindrical lenses, which are aligned perpendicular to the optical fiber.

One advantage results immediately from the use of a cylindrical lens array. It ensures that practically the entire incident laser light is used for exposure. The efficiency is consequently correspondingly high and is nearly 1. Additionally, the grid structures can be manufactured quickly and economically.

The special flexibility of the device according to the invention is a consequence of the fan-shaped arrangement of the cylindrical lenses within the array. This arrangement comes from the fact that the cylindrical lenses widen in the longitudinal direction, from an initial width A to A+dx for example, while the focal length remains constant. As a result, the distances of the focal points or lines, of the cylindrical lenses that are adjacent to each other within the array but not parallel, will also spread apart from each other, such as from an initial distance p up,to a distance p+dx at the other end of the array.

This produces the invention's special advantage that, for an illumination device located above, an optical fiber placed underneath the cylindrical lens array can be exposed with a grating period having any continuous value between p and p+dx, merely by displacing the array relative to the optical fiber in the lenses' longitudinal direction. To change the desired grating period, it is therefore only necessary to displace the array.

In addition to the possibility that has been presented for increasing the grating period by displacing the array perpendicular to the optical fiber, it is also conceivable that a combination of different grating constants could be produced by moving the entire array along the length of the fiber in discrete steps, and performing the exposure each time. If for example, displacements at a distance of dy were sequentially repeated, then several gratings with this period would be generated at a distance of p+dx from each other.

Appropriately, the cylindrical lens array is arranged on guides to carry out its movements. Depending on the desired direction of motion, the array can run on high-precision linear guides that are aligned perpendicular to and/or along the fiber. Precise and reproducible position control is ensured in this manner.

It is preferable for the above guides to be equipped with motor-operated actuators. Actuators of this kind, such as piezoelectric drives, stepping motors, or other drives, allow high-precision and largely automated displacements to be carried out. Connection of the actuators to computer-aided control systems allows efficient automated manufacture and program-controlled generation of different kinds of grids.

An advantageous intrinsic extension of the invention's possible applications results from making the individual cylindrical lenses in the array mobile with respect to one another. This produces the additional option of allowing the distances between the cylindrical lenses within the array to vary freely so that the grating periods produced will also vary freely to a large extent. This allows practically any grid structures, even non-equidistant grid structures, to be generated particularly efficiently. This provides the flexibility for special adaptation to different applications.

Appropriately, the individual cylindrical lenses in the above embodiment are likewise attached to high-precision guides, which are likewise preferably equipped with motorized actuators. In practice, this configuration then makes extensively automated computer-aided production of programmed grid structures possible.

In an advantageous extension of the invention, several cylindrical lens arrays according to the invention, each of which can swing between the laser emitter and optical fiber, are fastened to a movable support. For ease of handling and manufacturing, a limited region should be covered by each individual cylindrical lens array. A larger region can be covered, in automated manufacturing plants for example, by integrating the arrays corresponding to adjacent regions within one magazine-like movable support. Furthermore, it becomes substantially easier to combine grid structures with different periods.

In practical embodiments, the individual cylindrical lens arrays can be arranged next to or on top of each other on one rectangular magazine-like movable support, in rows or columns respectively, or circularly symmetrically on one round revolving mount.

Figure 2:
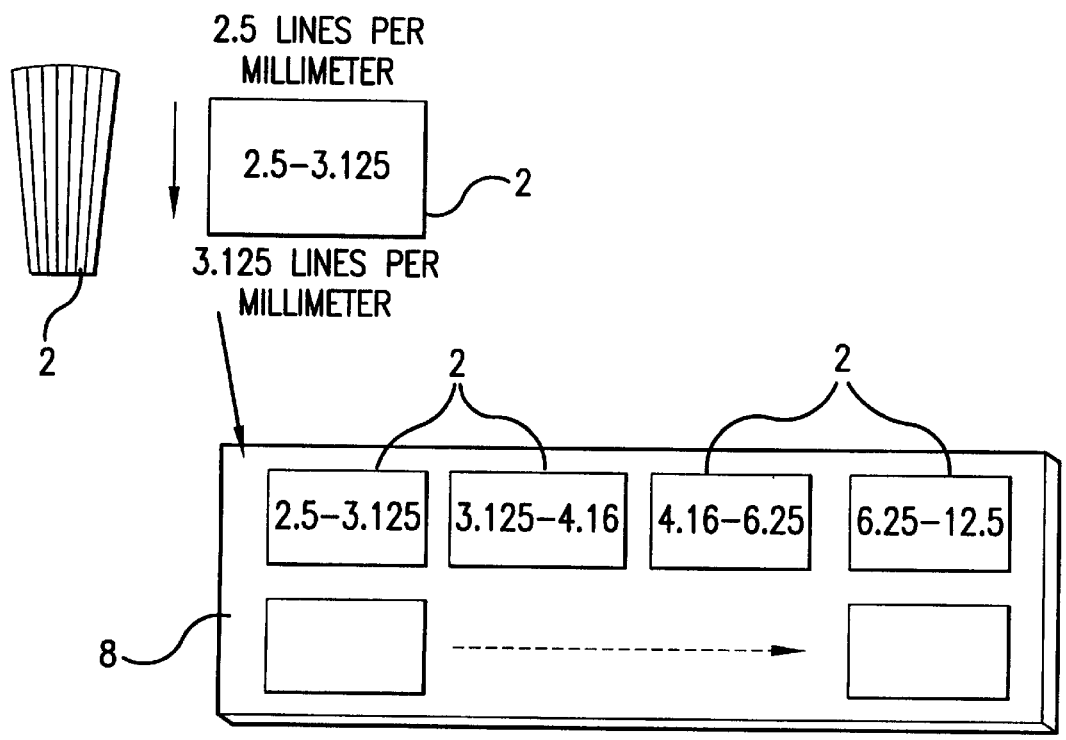
Figure 2:
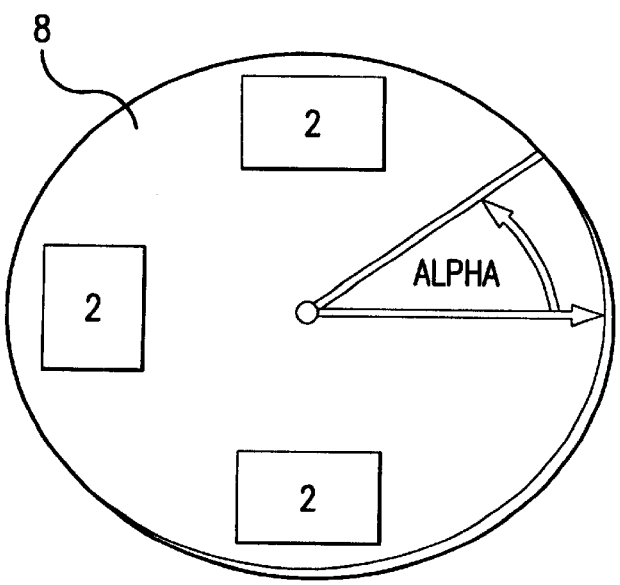

Examples will be described in more detail based on the drawings. The individual drawings show:

FIG. 1 a schematic perspective view of a device according to the invention;

FIG. 2 movable supports with cylindrical lens arrays according to the invention.

A device for making grid structures is illustrated in FIG. 1 in a perspective view. The device in its entirety is labeled 1. It has a fan-shaped cylindrical lens array 2, composed of a plurality of individual cylindrical lenses 3.

The array 2 is fastened to a high-precision linear guide 4, which can be displaced in the longitudinal direction of the cylinder lenses 3, and therefore perpendicular to an optical fiber 5, located underneath the array 2 in this drawing, by means of an actuator which is not shown.

In this illustration; a collimated line-shaped laser beam 6, whose cross section is crosshatched, shines from above (i.e. in the plane of the drawing) with a laser that is not shown in detail. The optical fiber 5 is located at the focus of the cylindrical lens array 2 in such a way that grid structures 7 are produced when it is illuminated with the laser beam bundle 6.

At the front end of the array 2, i.e., toward the bottom side of drawing, the individual cylindrical lenses 3 are separated by a distance p from each other. This distance expands to p+dx toward the rear, i.e., toward the top of the drawing. If the array 2 is now displaced perpendicularly to the optical fiber 5 on the guides 4, grid structures with the smallest period p can be manufactured, as explained at the bottom of the drawing. If the array is displaced in the other direction up to its limit stop, then a grating period of p+dx will result, as schematically shown at the top of the drawing.

The displacement can be computer-controlled if necessary. This would enable extensive automation of the process.

It is furthermore conceivable to fasten the array 4 on similar guides which are aligned parallel to the optical fiber 5. In this manner, the grid structures can be generated repeatedly in steps along the fibers length.

It is furthermore conceivable to attach the individual cylindrical lenses 3 on guides so that they can likewise be displaced relative to each other. Then any distances p+dx, p+dy, etc. can be set completely independently of each other. Non-equidistant grid structures 7 can then also be generated in this way.

In all these cases, an efficiency of almost 1 results from the nearly complete utilization of the laser beam bundle 6 by the cylindrical lens array 2. Exposure times could also be. shorter. Since the distances of the grid structures 3 can be changed by a mere displacement of the array 2 on the guides 4, a particularly rapid and flexible adaptation of different grid structures 7 is possible for manufacturing.

FIG. 2 illustrates how a large number of cylindrical lens arrays 2 according to the invention, each with different ranges of the distances p through p+dx, can be attached onto one movable support 8. This movable support 8 can be designed either rectangular, wherein the arrays 2 are grouped in rows and columns, or also circular, wherein the arrays 2 are distributed around the circumference.

In a device according to the invention, for example, a mechanism is installed which allows the individual arrays 2 to be placed into the beam path as illustrated in FIG. 1. The possibilities for the system's application will be greatly extended by the totality of all regions covered by the individual arrays 2.

What is claimed is:

1. A device for making grid structures in optical fibers by local laser radiation, with a laser emitter directed toward the surface enveloping the optical fiber, as well as beam converting elements inserted between the laser emitter and the optical fiber, characterized in that said beam converting elements have at least one fan-shaped cylindrical lens array (2) aligned perpendicular to said optical fiber (5), with said optical fiber (5) being placed in its focal plane, and which can also be displaced relative to said optical fiber (5).

2. A device according to claim 1, characterized in that said cylindrical lens array (2) is attached to guides (4).

3. A device according to claim 1, characterized in that said cylindrical lens array (2) is displaceable in the longitudinal direction of said cylindrical lenses.

4. A device according to claim 1, characterized in that said cylindrical lens array (2) is displaceable perpendicular to the longitudinal direction of the cylindrical lenses.

5. A device according to claim 1, characterized in that the individual cylindrical lenses (3) in said cylindrical lens array (2) can be moved relative to one another.

6. A device according to claim 5, characterized in that said cylindrical lenses (3) are attached to guides (4).

7. A device according to claims 1 or 6, characterized in that said guides (4) are equipped with motorized actuators.

8. A device according to claim 1, characterized in that a plurality of cylindrical lens arrays (2), each of which can swing between the laser emitter and optical fiber (5), are fastened to a movable support (8).

* * * * *